(12) United States Patent
Ziemer

(10) Patent No.: US 12,473,051 B2
(45) Date of Patent: Nov. 18, 2025

(54) ELECTRIC DRIVE DEVICE FOR A BICYCLE AND BICYCLE HAVING SAME

(71) Applicant: ZF Friedrichshafen AG, Friedrichshafen (DE)

(72) Inventor: Peter Ziemer, Bad Woerishofen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/714,616

(22) PCT Filed: Nov. 28, 2022

(86) PCT No.: PCT/EP2022/083453
§ 371 (c)(1),
(2) Date: May 30, 2024

(87) PCT Pub. No.: WO2023/099393
PCT Pub. Date: Jun. 8, 2023

(65) Prior Publication Data
US 2025/0019031 A1 Jan. 16, 2025

(30) Foreign Application Priority Data
Nov. 30, 2021 (DE) .......................... 102021213515.3

(51) Int. Cl.
*B62M 6/55* (2010.01)
*B62M 1/36* (2013.01)
*B62M 11/14* (2006.01)

(52) U.S. Cl.
CPC ................ *B62M 6/55* (2013.01); *B62M 1/36* (2013.01); *B62M 11/145* (2013.01)

(58) Field of Classification Search
CPC .......... B62M 6/55; B62M 1/36; B62M 11/145
See application file for complete search history.

(56) References Cited

U.S. PATENT DOCUMENTS 8,636,095 B2 * 1/2014 Ito ....................... B60L 15/2009
180/206.6
11,247,749 B2 * 2/2022 Hinterkausen ....... B62M 11/145
(Continued)

FOREIGN PATENT DOCUMENTS

| CN | 205239827 U | 5/2016 |
| DE | 102016225142 A1 | 6/2018 |

(Continued)

OTHER PUBLICATIONS

German Search Report for Application No. 102021213515.3 Dated Jul. 4, 2022.

*Primary Examiner* — Huan Le
(74) *Attorney, Agent, or Firm* — Dority & Manning, P.A.

(57) ABSTRACT

An electric drive device for a bicycle includes a transmission, an electric motor, a drive shaft, and a drive wheel arranged coaxially to the drive shaft. A first freewheeling element and a second freewheeling element are arranged in a one-piece freewheeling element carrier. The drive wheel is connectable to the drive shaft via the one-piece freewheeling element carrier by the first freewheeling element, and a rotary element of a planetary gear set of the transmission is connectable to the drive shaft via the one-piece freewheeling element carrier by the second freewheeling element. Another rotary element of the planetary gear set of the transmission is formed in one piece with a power transfer device.

14 Claims, 5 Drawing Sheets

(56) References Cited

U.S. PATENT DOCUMENTS

2017/0050700 A1* 2/2017 Lemmens ................ B62M 6/45
2017/0137086 A1* 5/2017 Yamamoto ................ F16H 3/66

FOREIGN PATENT DOCUMENTS

| DE | 102016225168 A1 | 6/2018 |
| DE | 102017218448 A1 | 4/2019 |
| DE | 102019207817 A1 | 12/2019 |
| DE | 102020203711 A1 | 9/2021 |
| EP | 3630592 B1 | 7/2021 |

* cited by examiner

ELECTRIC DRIVE DEVICE FOR A BICYCLE AND BICYCLE HAVING SAME

CROSS-REFERENCE TO RELATED APPLICATIONS

The present application is related and has right of priority to German Patent Application No. DE102021213515.3 filed on Nov. 30, 2021 and is a U.S. National Phase of PCT/EP2022/083453 filed on Nov. 28, 2022, both of which are incorporated by reference in their entirety for all purposes.

TECHNICAL FIELD

The present invention relates generally to an electric drive device for a bicycle. The invention also relates generally to a bicycle having the electric drive device.

BACKGROUND

Electric bicycles, in particular pedelecs that are driven in a hybrid manner—electrically by an electric motor and by muscle power by pedals—are known. These have an electric motor arranged on a receiving region of a pedal shaft of the electric bicycle. A gear mechanism for transmitting torque from the electric motor and the pedals of the electric bicycle to a drive shaft of the electric bicycle is also arranged in the receiving region of the pedal shaft of the electric bicycle. The amount of installation space in the vicinity of the receiving region of the pedal shaft of the electric bicycle, however, is limited.

BRIEF SUMMARY

In a first example aspect, the invention relates to an electric drive device for a bicycle. The drive device can be designed to transmit an electrically generated drive power to a drive axle of the bicycle. Alternatively or additionally, the drive device can be designed to transmit drive power generated by muscle power, for example by turning the pedals of the bicycle, to the drive axle of the bicycle. For example, the drive device can be used to generate a torque which can be transmitted to the drive axle of the bicycle in order to drive the latter. The drive device can have a hybrid design, i.e. can be designed so that the bicycle is driven both electrically and by muscle power. The bicycle can be an electric bicycle, in particular a pedelec driven in a hybrid manner. In the case of a pedelec, drive power of the bicycle generated by muscle power can be combined with electrically generated drive power of the bicycle.

The electric drive device includes a gear mechanism, which is arranged in a bottom bracket of the bicycle. A bottom bracket can be the portion of the bicycle frame on which the pedals for driving the bicycle are arranged. A housing of the bottom bracket can be designed in the form of a tube in which the pedals of the bicycle are mounted. The gear mechanism can also be mounted in the housing. Furthermore, a chain ring, which can be designed to transmit the drive power generated by the drive device to a drive axle of the bicycle, can be arranged in the region of the bottom bracket. The gear mechanism can be designed so that the drive power applied by the drive device, in the form of a drive speed generated by the drive device, is converted, by various conversion members, into an output speed acting on a drive shaft.

The gear mechanism includes at least one planetary gear set, wherein the planetary gear set includes at least three rotary elements, which are arranged so as to be rotatable relative to one another and are designed for torque transmission. The three rotary elements which are arranged so as to be rotatable relative to one another can be a sun gear, a planet carrier including at least one planet gear, and a ring gear of the planetary gear set. The sun gear, the planet carrier and the ring gear can each be arranged on rotatably mounted shafts. The sun gear, the planet gear and the ring gear can each be designed as intermeshing gearwheels. Depending on the diameter of the individual gearwheels and the relative rotational speed thereof, torques can thus be transmitted between the sun gear, the planet carrier and the ring gear. For example, the ring gear can be prevented from rotating, and the ring gear can therefore be fixed. The sun gear can be coupled to a drive shaft of the bicycle. The planet carrier can be coupled to a pedal-crank shaft of the bicycle. Since both the sun gear and the ring gear mesh with the planet carrier, a torque can thus be transmitted from the drive device to the drive shaft of the bicycle.

Furthermore, the electric drive device includes an electric motor, which is offset in relation to the gear mechanism, and a drive shaft, which is mounted at least on a pedal-crank shaft of the bicycle. The electric motor can be designed to convert electrical energy into mechanical energy. The electric motor can be designed, for example, as a synchronous motor or an asynchronous motor. An output shaft of the electric motor can be connected to a rotor of the electric motor for example in a permanently rotationally fixed manner. The electric motor can be arranged, for example, axially parallel to a longitudinal axis of the gear mechanism or of the bottom bracket. The pedal-crank shaft can be a mechanical shaft mounted along the longitudinal direction of the bottom bracket. The pedal-crank shaft can protrude, at at least one of the end portions, from the bottom bracket. A pedal crank, on which a pedal for mechanically driving the bicycle can be mounted, can be mounted in each case at opposite end portions of the pedal-crank shaft. The drive shaft can be designed in the form of a hollow shaft, which is attached to the pedal-crank shaft so as to be mechanically operatively connected thereto. The drive power generated by the pedal cranks can be transmitted in the form of a torque to the drive shaft via the pedal-crank shaft. The drive shaft can furthermore be mechanically operatively connected to at least one rotary element of the planetary gear set of the gear mechanism. The drive shaft can furthermore be mechanically operatively connected to an output shaft of the electric motor.

Furthermore, the electric drive device includes a drive wheel, which is arranged coaxially with the drive shaft and is intended to transmit motor power from the electric motor to the drive shaft. The drive wheel can be designed in the form of a gearwheel, which can be coupled to an output shaft of the electric motor via a traction mechanism. The traction mechanism can be a chain or a toothed belt, which can mesh with toothing of the gearwheel. Alternatively, the drive wheel can be a pulley, which can be connected to the traction mechanism in a frictionally fitting manner.

In addition, the electric drive device includes a first freewheeling element and a second freewheeling element. The first freewheeling element and the second freewheeling element are arranged together in a one-piece freewheeling-element carrier. The first freewheeling element can be designed to couple two components of the drive device in a manner dependent on the direction of rotation. Therefore, the first freewheeling element can be designed to connect the two components of the drive device for torque transmission in a first direction of rotation. In a second direction of rotation, which is counter to the first direction of rotation, the first freewheeling element can be used to release or break the connection between the two components. For example, the first freewheeling element can be used to block a shaft from rotating within the drive device in a first direction of rotation. What has been said in relation to the first freewheeling element applies analogously to the second freewheeling element. Therefore, a direction-of-rotation-dependent coupling function of two components of the drive device can be realized using the first and/or second freewheeling element. The first and the second freewheeling elements can have pawls. Alternatively, the first and the second freewheeling elements can have clamping rollers, clamping bodies, claw rings or wrap springs. The first and the second freewheeling elements are arranged together in a freewheeling-element carrier as one piece. The freewheeling-element carrier is therefore a single component in which certain regions of the first freewheeling element and the second freewheeling element are arranged in each case.

The drive wheel is connectable to the drive shaft by the first freewheeling element, via the one-piece freewheeling-element carrier. Furthermore, one of the rotary elements of the planetary gear set of the gear mechanism is connectable to the drive shaft by the second freewheeling element, via the one-piece freewheeling-element carrier. The first freewheeling element can therefore couple the drive wheel, or the electric motor connected thereto, to the drive shaft in a manner dependent on the direction of rotation. The second freewheeling element can therefore couple one of the rotary elements of the planetary gear set of the gear mechanism, for example the ring gear, to the drive shaft in a manner dependent on the direction of rotation. On account of the one-piece freewheeling-element carrier, these two coupling functions can be realized by way of a single component.

Another of the rotary elements of the planetary gear set of the gear mechanism is formed in one piece with a force-transmission device of the gear mechanism. The other rotary element of the planetary gear set can be, for example, the sun gear, while the ring gear of the planetary gear set is connectable to the drive shaft by the second freewheeling element, via the one-piece freewheeling-element carrier. A force-transmission device of the gear mechanism can be a force-transmission component which is arranged so as to transmit torque, for example rotatably, within the gear mechanism. Alternatively, a force-transmission device of the gear mechanism can be a plurality of force-transmission components which are arranged relative to one another so as to transmit torque, in particular rotatably, within the gear mechanism.

Therefore, according to example aspects of the proposed electric drive device for a bicycle, both the freewheeling-element carrier itself and another of the rotary elements of the planetary gear set are formed in one piece with a force-transmission device of the gear mechanism. This allows the number of components to be cut back. Furthermore, this also makes it possible to cut back on the amount of installation space required within the bottom bracket, since fewer components have to be accommodated within the bottom bracket. In addition, the drive device can also be designed in a more straightforward and cost-effective manner, since fewer components have to be used.

According to one example embodiment of the drive device, the force-transmission device of the gear mechanism can be formed by the drive shaft. In this example embodiment, one of the rotary elements of the planetary gear set of the gear mechanism can thus be connectable to the drive shaft by the second freewheeling element, via the one-piece freewheeling-element carrier. Another of the rotary elements of the planetary gear set of the gear mechanism can be formed in one piece with the drive shaft. It is therefore possible, in particular in the design of the gear mechanism, to cut back on the number of components, for example toothing between the drive shaft and the rotary elements of the planetary gear set. On account of the one-piece design of, i.e. the direct connection between, one of the rotary elements of the planetary gear set and the drive shaft, a loss of friction can moreover be minimized during torque transmission between these components.

According to another example embodiment of the drive device, the force-transmission device of the gear mechanism can be formed by the one-piece freewheeling-element carrier. In this example embodiment, the one-piece freewheeling-element carrier can therefore be formed in one piece with a rotary element of the planetary gear set. This makes it possible for the additional installation of the freewheeling-element carrier between the rotary elements of the planetary gear set to be dispensed with. The drive device can therefore be mounted in a more straightforward manner. In addition, this configuration by a single component allows both the function of torque transmission and the function of coupling between two torque-transmitting components to be realized. This makes it possible to reduce the complexity of the gear mechanism.

According to another example embodiment of the drive device, the force-transmission device of the gear mechanism can be formed by the drive shaft and the one-piece freewheeling-element carrier. In this example embodiment, the functions and advantages outlined above can be combined.

According to another example embodiment, the drive shaft of the bicycle can be mechanically operatively connected to at least one pedal crank, wherein a force-transmission path can lead from the pedal crank to the drive shaft via the gear mechanism. The pedal crank can be mounted, for example, on the pedal-crank shaft. In this case, the drive shaft can be mechanically operatively connected to the pedal crank via the pedal-crank shaft, on which the drive shaft is mounted. In addition, the drive shaft is connectable to further gear-mechanism components via the first and/or the second freewheeling element. Therefore, if drive power generated manually by pedaling the pedals mounted on the pedal cranks is applied to the pedal cranks, this can be transmitted to the drive shaft via the operative connection outlined above.

In this example embodiment, the motor power from the electric motor can be transmitted to the drive shaft in the end region of the force-transmission path. The motor power from the electric motor can be transmitted to the drive shaft by the drive wheel, which is arranged coaxially with the drive shaft. In this example embodiment, the drive wheel can be arranged within the drive device in such a manner that the motor power from the electric motor is transmitted to the drive shaft at the output of the gear mechanism. The drive power applied via the pedal cranks can therefore initially be guided via the pedal-crank shaft to the gear mechanism for torque transmission, i.e. for setting a suitable transmission ratio of the rotary elements of the planetary gear set. After a suitable transmission ratio has been set, i.e. shifting has taken place, the drive power can be boosted by the motor power from the electric motor and applied to the drive shaft. This configuration offers the advantage that shifting can take place without the additional motor power from the electric motor, i.e. without any load. This allows the service life of the gear mechanism to be extended.

According to another example embodiment, the drive wheel can be mounted on the drive shaft. The drive wheel can be mounted directly on the drive shaft. Alternatively, the drive wheel can be mounted indirectly, for example by another rotary element, on the drive shaft. The drive wheel can be mounted on the drive shaft in particular so as to transmit torque. This configuration offers the advantage that the motor power from the electric motor can be transmitted in a particularly straightforward manner to the drive shaft by the drive wheel.

According to one example embodiment, the drive wheel can be mounted in a housing of the drive device. Mounting the drive wheel in the housing of the drive device makes it possible for installation space to be saved within the drive device.

According to another example embodiment, the first freewheeling element and the second freewheeling element can be arranged within the one-piece freewheeling-element carrier so as to be, at least in certain regions, axially adjacent to one another with respect to a longitudinal axis of the drive shaft. The longitudinal axis of the drive shaft can correspond, for example, to the axis along which the drive shaft extends in the bottom bracket. The first freewheeling element and the second freewheeling element can be arranged so as to be, at least in certain regions, adjacent to each other along this axis. For example, the first freewheeling element and the second freewheeling element can be in contact with each other at their respective outer surfaces which are oriented perpendicularly in relation to the longitudinal axis of the drive shaft. In this example embodiment, the extent of the one-piece freewheeling-element carrier along the longitudinal axis of the drive shaft can therefore be larger than the extent perpendicular to this axis. Thus, in this example embodiment, it is possible to cut back on the amount of installation space required in the radial direction with respect to the longitudinal axis of the drive shaft.

According to another example embodiment, the first freewheeling element and the second freewheeling element can be arranged within the one-piece freewheeling-element carrier so as to be, at least in certain regions, radially adjacent to each other with respect to the longitudinal axis of the drive shaft. The longitudinal axis of the drive shaft can correspond, for example, to the axis along which the drive shaft extends in the bottom bracket. Running radially outwards from this axis, the first freewheeling element and the second freewheeling element can be arranged so as to be, at least in certain regions, adjacent to each other. In this example embodiment, the extent of the one-piece freewheeling-element carrier perpendicular to the longitudinal axis of the drive shaft can therefore be larger than the extent parallel to this axis. As a result, in this example embodiment, it is possible to cut back on the amount of installation space required in the axial direction with respect to the longitudinal axis of the drive shaft.

According to another example embodiment, the first freewheeling element and the second freewheeling element can be oriented in the same direction within the one-piece freewheeling-element carrier with respect to a longitudinal axis of the drive shaft. For example, the first freewheeling element and the second freewheeling element can be designed as first and second pawls. The first and the second pawls can be oriented within the one-piece freewheeling-element carrier in such a manner that the pawls can be extended, at least in certain regions, radially outwards with respect to the longitudinal axis of the drive shaft. Alternatively, the first and the second pawls can be extended radially inwards with respect to the longitudinal axis of the drive shaft. Further configurations of the first and second freewheeling elements and the respective orientation thereof are also conceivable. This example embodiment offers the advantage that the first and the second freewheeling elements can be formed in a particularly straightforward manner, specifically in the same direction, within the one-piece freewheeling-element carrier.

According to another example embodiment, the first freewheeling element and the second freewheeling element can be oriented in opposite directions within the one-piece freewheeling-element carrier with respect to a longitudinal axis of the drive shaft. For example, the first freewheeling element and the second freewheeling element can be designed as first and second pawls. The first and the second pawls can be oriented within the one-piece freewheeling-element carrier in such a manner that the first pawl can be extended, at least in certain regions, radially outwards with respect to the longitudinal axis of the drive shaft. The second pawl can be extended, at least in certain regions, radially inwards with respect to the longitudinal axis of the drive shaft. Further configurations of the first and second freewheeling elements and the respective orientation thereof are also conceivable. This example embodiment offers the advantage that the first and the second freewheeling elements can be formed in a particularly straightforward manner, specifically mirrored in the axial direction, within the one-piece freewheeling-element carrier.

According to another example embodiment, the first freewheeling element and the second freewheeling element can be arranged within the one-piece freewheeling-element carrier at a predefined distance from a longitudinal axis of the drive shaft. The predefined distance of the one-piece freewheeling-element carrier from the longitudinal axis of the drive shaft can be determined or defined, for example, by an expected load-bearing capacity of the first freewheeling element and of the second freewheeling element. For example, in the case of a comparatively high expected load-bearing capacity, the first freewheeling element and the second freewheeling element can be arranged at a comparatively large distance from the longitudinal axis of the drive shaft. Alternatively, in the case of a comparatively low expected load-bearing capacity, the first freewheeling element and the second freewheeling element can be arranged at a comparatively small distance from the longitudinal axis of the drive shaft. Thus, the torque acting on the one-piece freewheeling-element carrier can be adjusted by suitably selecting the distance of the latter from the longitudinal axis of the drive shaft. This allows the service life of the one-piece freewheeling-element carrier to be extended.

In a second example aspect, the invention relates to a bicycle including the electric drive device according to the first example aspect and two pedal cranks arranged at opposite end portions of the pedal-crank shaft. The pedal cranks are mechanically operatively connected to the drive shaft attached to the pedal-crank shaft, for the purpose of manually driving the bicycle. Respective other features, embodiments and advantages can be found in the description of the first example aspect. Conversely, features, embodiments and advantages of the second example aspect also constitute features, embodiments and advantages of the first example aspect.

DETAILED DESCRIPTION

Figure 1:
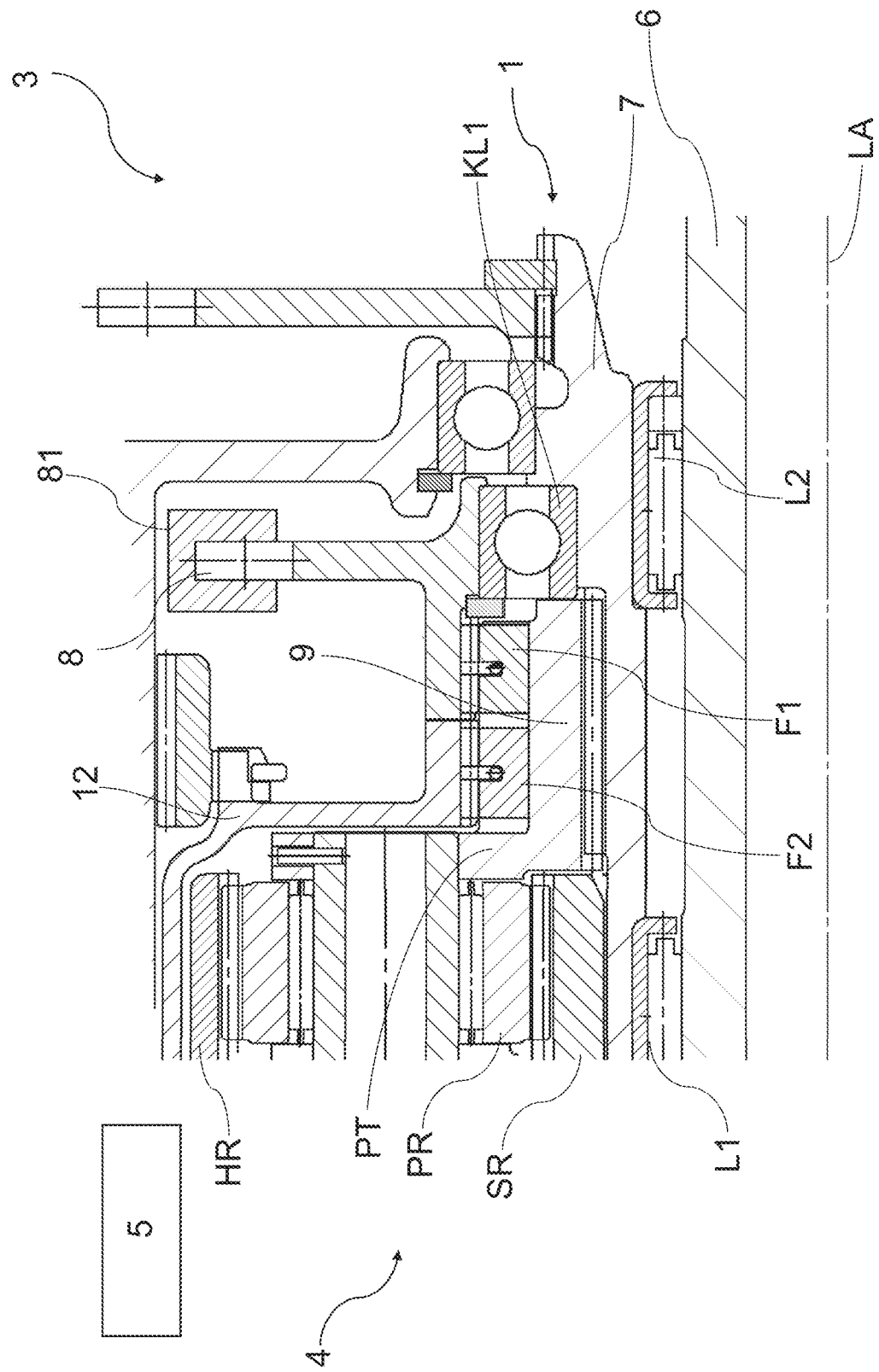
FIG. 1 schematically shows a detail of an electric drive device according to one example embodiment of the invention arranged in a bottom bracket of a bicycle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 schematically shows a detail of an electric drive device 1 arranged in a bottom bracket 3 of a bicycle, which is not shown in FIG. 1. The drive device 1 continues downwards in a horizontally mirrored manner with respect to the illustrated view. The electric drive device 1 includes a gear mechanism 4, which is arranged in the bottom bracket 3. In FIG. 1, the gear mechanism 4 is illustrated as a planetary gear mechanism 4 and includes a sun gear SR, a plurality of planet gears PR arranged on a planet carrier PT, and a ring gear HR. The planetary gear mechanism 4 is formed in a known manner for torque transmission by the sun gear SR, the planet carrier PT and the ring gear HR.

The drive device 1 further includes an electric motor 5, which is offset in relation to the gear mechanism 4 and is intended to drive the bicycle electrically. In the illustration in FIG. 1, the electric motor 5 is arranged axially parallel to a longitudinal axis of the gear mechanism 4. In this case, the electric motor 5 is offset in relation to the gear mechanism 4 relative to the plane of the drawing in FIG. 1. A pedal-crank shaft 6, which is mechanically operatively connected to pedal cranks, which are not illustrated in FIG. 1, for driving the bicycle by muscle power, is mounted in the bottom bracket 3 of the bicycle. A drive shaft 7 is mounted on the pedal-crank shaft 6. In the illustration in FIG. 1, the drive shaft 7 is designed as a hollow shaft, which is mounted on the pedal-crank shaft 6 by bearings L1, L2.

In order for the bicycle to be driven electrically, the electric motor 5 is mechanically operatively connected to a drive wheel 8, which is arranged coaxially with the drive shaft 7. A traction mechanism 81, which is a chain 81 in the illustration in FIG. 1, is used to transmit a torque generated by the electric motor 5 to the drive wheel 8 and from the latter to the drive shaft 7. The drive wheel 8 is mounted on the drive shaft 7 by a ball bearing KL1.

The electric drive device 1 further includes a first freewheeling element F1 and a second freewheeling element F2. In the illustration in FIG. 1, the first and second freewheeling elements F1, F2 are illustrated as first and second pawls, respectively. The first pawl F1 and the second pawl F2 are arranged together in a one-piece freewheeling-element carrier 9. The one-piece freewheeling-element carrier 9 is a single component in which certain regions of the first freewheeling element F1 and the second freewheeling element F2 are arranged in each case.

For transmitting the motor power from the electric motor 5, the drive wheel 8 is connectable to the drive shaft 7 by the first freewheeling element F1, in particular via the one-piece freewheeling-element carrier 9. Thus, the electric motor 5 can be coupled to the drive shaft 7 by the first freewheeling element F1, via the one-piece freewheeling-element carrier 9, in a manner dependent on the direction of rotation.

One of the rotary elements of the planetary gear set of the gear mechanism 4 is connectable to the drive shaft 7 by the second freewheeling element F2, in particular via the one-piece freewheeling-element carrier 9. In the illustration in FIG. 1, a rotary element 12, which is only partially illustrated, of the gear mechanism 4 is connectable to the drive shaft 7 via the second freewheeling element F2. Therefore, this rotary element 12 of the gear mechanism 4 can be coupled to the drive shaft 7 by the second freewheeling element F2, via the one-piece freewheeling-element carrier 9, in a manner dependent on the direction of rotation.

In the example embodiment in FIG. 1, another of the rotary elements of the planetary gear set of the gear mechanism 4 is furthermore formed in one piece with a force-transmission device 7, 9 of the gear mechanism 4. In the illustration in FIG. 1, the force-transmission device 7, 9 of the gear mechanism 4 is formed by the one-piece freewheeling-element carrier 9. The planet carrier PT of the planetary gear set of the gear mechanism 4 is formed in one piece with this force-transmission device 9.

In the one-piece freewheeling-element carrier 9 in the illustration in FIG. 1, the first freewheeling element F1 and the second freewheeling element F2 are illustrated as first and second pawls F1, F2, respectively. The first and second pawls F1, F2 are arranged so as to be axially adjacent to each other with respect to a longitudinal axis LA of the drive shaft 7. Furthermore, in the illustration in FIG. 1, the first and second pawls F1, F2 are each oriented radially outwards, i.e. in the same direction, with respect to the longitudinal axis LA of the drive shaft 7. Furthermore, in the illustration in FIG. 1, the first and second pawls F1, F2 are arranged at a comparatively small predefined distance from the longitudinal axis LA of the drive shaft 7.

Figure 2:
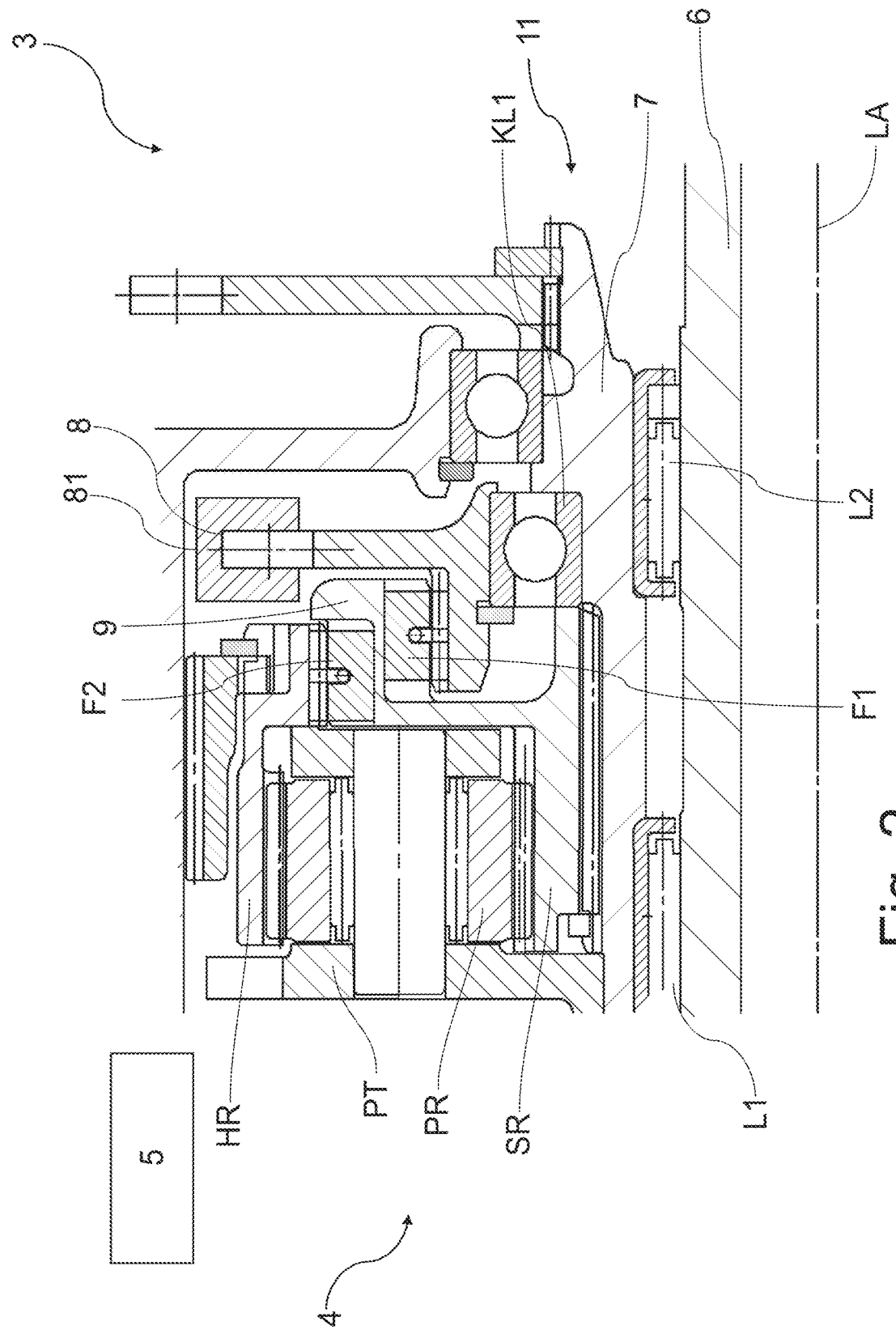
FIG. 2 schematically shows a detail of an electric drive device according to another example embodiment of the invention arranged in a bottom bracket of a bicycle.

FIG. 2 schematically shows a detail of an electric drive device 11 according to another example embodiment. The elements of the drive device 11 which are provided with the same reference signs in FIG. 2 are equivalent to those of the drive device 1 in FIG. 1. These elements will not be discussed in any more detail in the explanation of FIG. 2.

The drive device 11 in FIG. 2 differs from the drive device 1 in FIG. 1 in that, in this case, the ring gear HR of the planetary gear set of the gear mechanism 4 is connectable to the drive shaft 7 by the second freewheeling element F2, in particular via the one-piece freewheeling-element carrier 9. Analogously to the drive device 1 in FIG. 1, in the illustration in FIG. 2, the force-transmission device 7, 9 of the gear mechanism 4 is likewise formed by the one-piece freewheeling-element carrier 9. In contrast to the illustration in FIG. 1, in the drive device 11 in FIG. 2, the sun gear SR, rather than the planet carrier PT, of the planetary gear set of the gear mechanism 4 and the one-piece freewheeling-element carrier 9 are formed in one piece.

In the illustration in FIG. 2, the first freewheeling element F1 and the second freewheeling element F2 are likewise illustrated as first and second pawls F1, F2, respectively. The first and second pawls F1, F2 are arranged so as to be, at least in certain regions, radially adjacent to each other with respect to a longitudinal axis LA of the drive shaft 7.

Furthermore, in the illustration in FIG. 2, the first pawl F1 is oriented radially inwards, but the second pawl F2 is oriented radially outwards, with respect to the longitudinal axis LA of the drive shaft 7. This makes it possible to cut back, in comparison with the example embodiment in FIG. 1, on the amount of installation space required in the axial direction of the drive device 11. Furthermore, in the illustration in FIG. 2, the first and second pawls F1, F2 are arranged at a larger predefined distance from the longitudinal axis LA of the drive shaft 7 in comparison with the illustration in FIG. 1.

Figure 3A:
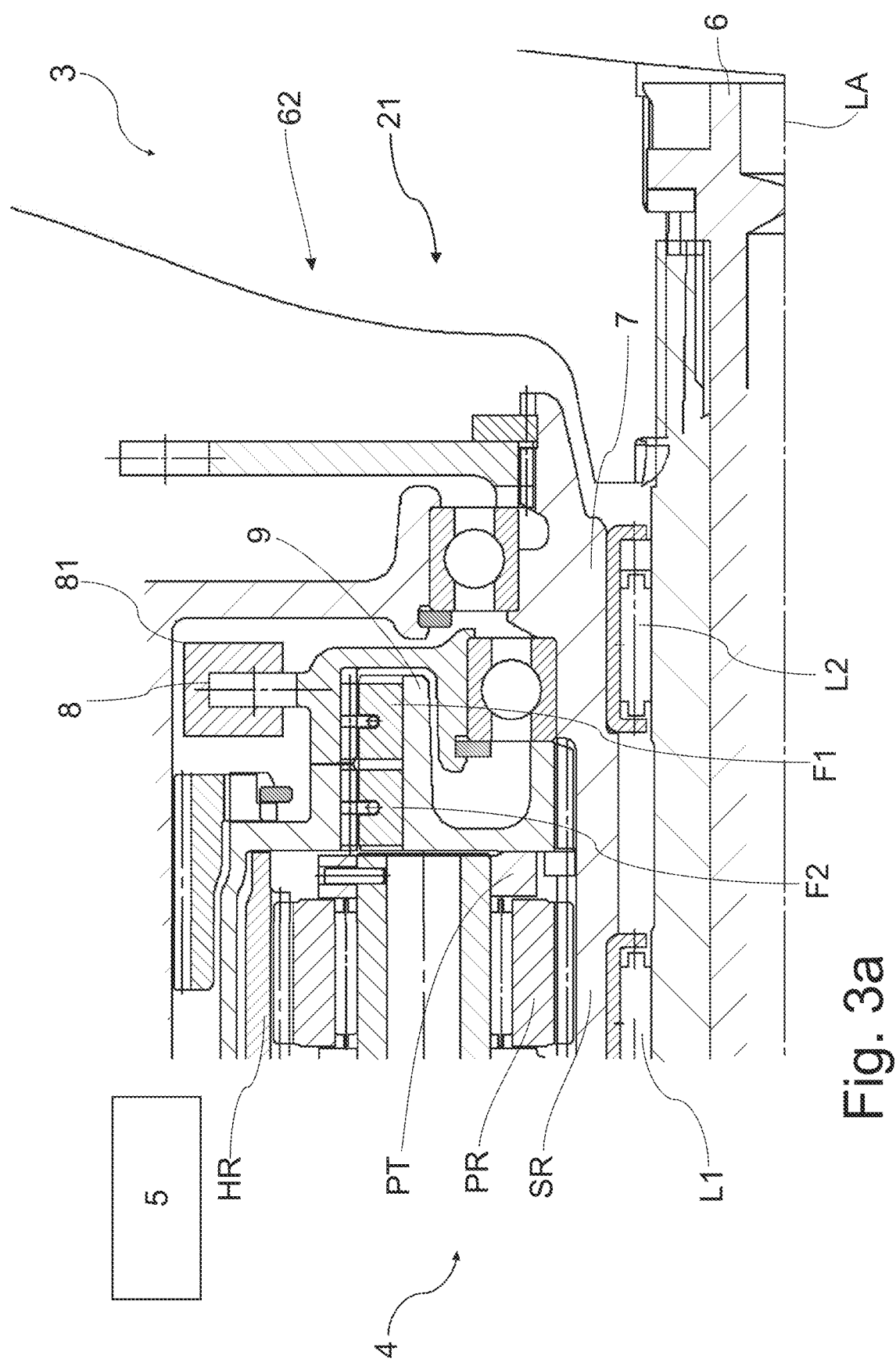
FIG. 3a schematically shows a detail of an electric drive device according to another example embodiment of the invention arranged in a bottom bracket of a bicycle.

FIG. 3a schematically shows a detail of an electric drive device 21 according to another example embodiment. The elements of the drive device 21 which are provided with the same reference signs in FIG. 3 are equivalent to those of the drive device 1 in FIG. 1 and of the drive device 11 in FIG. 2. These elements will not be discussed in any more detail in the explanation of FIG. 3a.

In the drive device 21 in FIG. 3a, the ring gear HR of the planetary gear set of the gear mechanism 4 is again connectable to the drive shaft 7 by the second freewheeling element F2, i.e. via the one-piece freewheeling-element carrier 9. In contrast to the drive device 1 in FIG. 1 and the drive device 11 in FIG. 2, in the illustration of FIG. 3, the force-transmission device 7, 9 of the gear mechanism 4 is formed, however, by the drive shaft 7. Therefore, in the drive device 21 in FIG. 3, the sun gear SR of the planetary gear set of the gear mechanism 4 and the drive shaft 7 are formed in one piece.

In the illustration in FIG. 3a, the first freewheeling element F1 and the second freewheeling element F2 are likewise illustrated as first and second pawls F1, F2, respectively. The first and second pawls F1, F2 are arranged so as to be, at least in certain regions, axially adjacent and radially inwardly facing, i.e. in the same direction as each other, with respect to a longitudinal axis LA of the drive shaft 7. Furthermore, in the illustration in FIG. 3a, the first and second pawls F1, F2 are arranged at a larger predefined distance from the longitudinal axis LA of the drive shaft 7 in comparison with the illustration in FIGS. 1 and 2. This makes it possible for the pawls F1 and F2 to absorb a greater amount of torque in comparison with the drive devices 1 and 11.

Figure 3B:
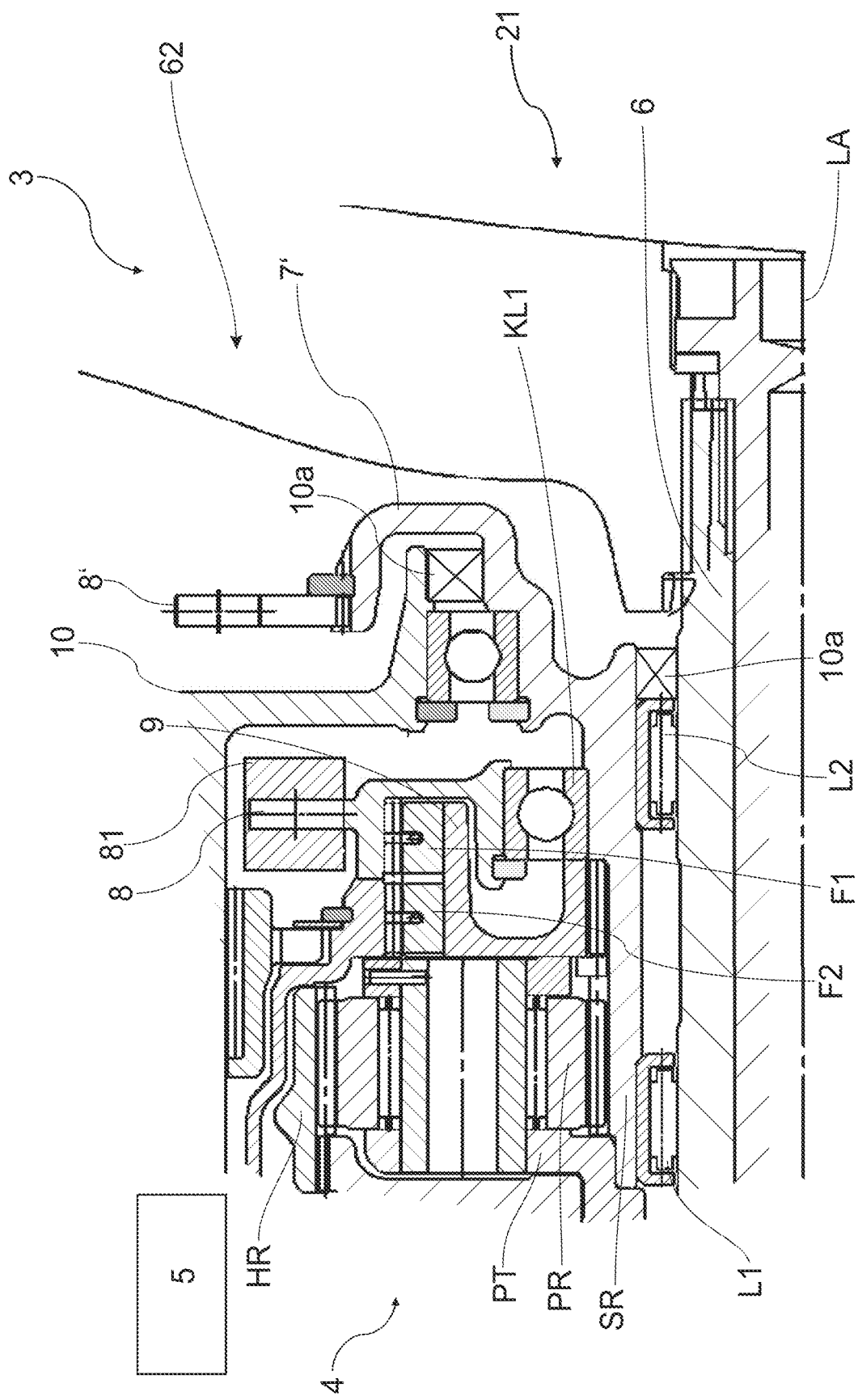
FIG. 3b schematically shows a detail of an electric drive device according to an example development of the example embodiment in FIG. 3a arranged in a bottom bracket of a bicycle.

FIG. 3b schematically shows an example development of the drive device 21 according to FIG. 3a. In this case, the drive shaft 7' of the drive device 21 is lengthened outwards in the radial direction with respect to the longitudinal axis LA. This configuration offers the advantage that, for transmitting drive power from the drive device 21 to a drive axle of the bicycle, another drive wheel 8' can be mounted on the drive shaft 7' at a reduced distance therefrom. Moreover, a sealing element 10a is arranged between the radially outwardly lengthened drive shaft 7' and a housing 10 of the drive device 21. The sealing element 10a can be used to seal off the housing 10 of the drive device 21 against an ingress of dirt and/or moisture.

Figure 4:
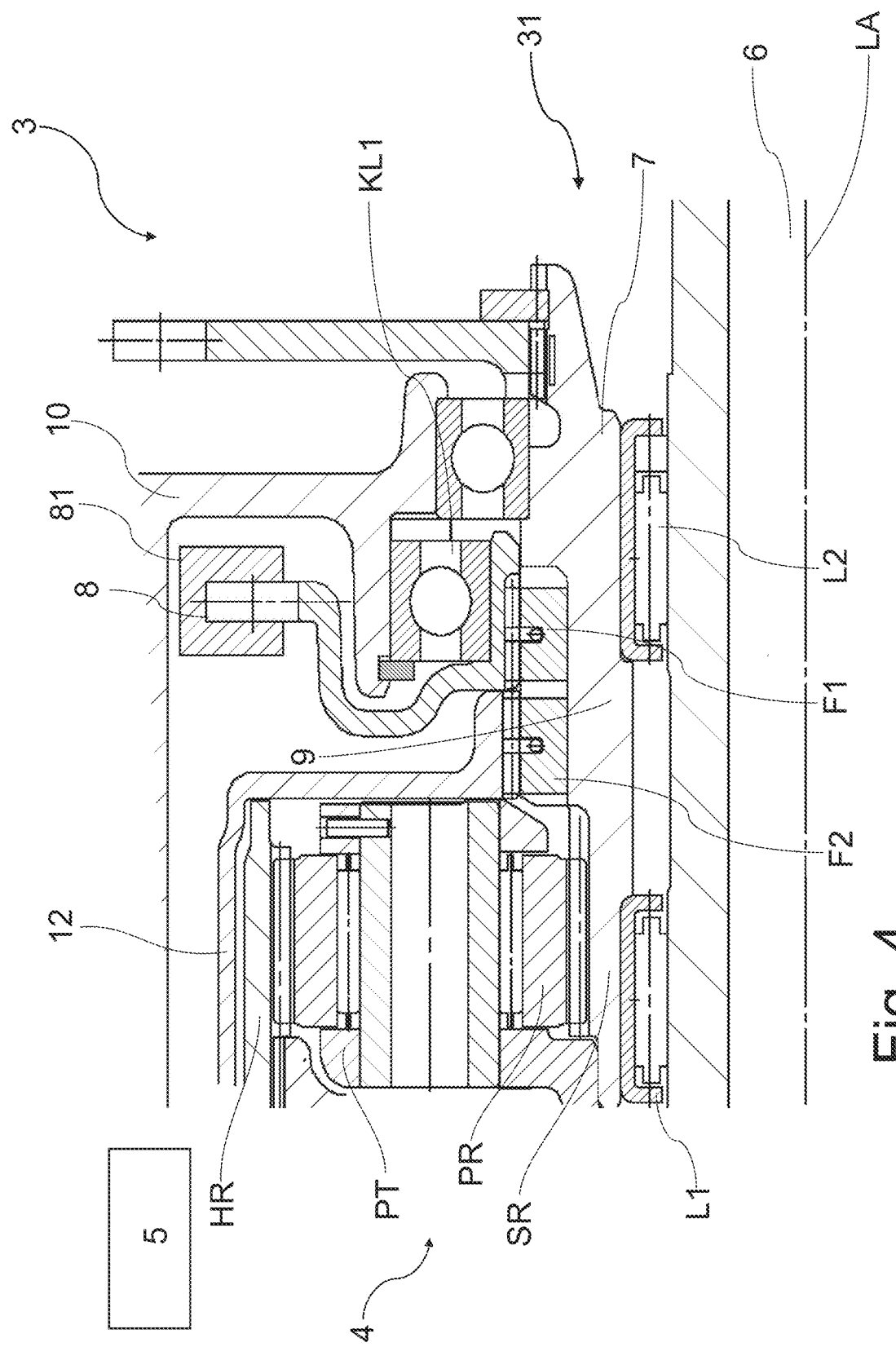
FIG. 4 schematically shows a detail of an electric drive device according to another example embodiment of the invention arranged in a bottom bracket of a bicycle.

FIG. 4 schematically shows a detail of an electric drive device 31 according to another example embodiment. The elements of the drive device 31 which are provided with the same reference signs in FIG. 4 are equivalent to those of the drive device 1 in FIG. 1, of the drive device 11 in FIG. 2 and of the drive device 21 in FIGS. 3a and 3b. These elements will not be discussed in any more detail in the explanation of FIG. 4.

In the drive device 31 in FIG. 4, as in FIG. 1, the rotary element 12, which is only partially illustrated, of the planetary gear set of the gear mechanism 4 is connectable to the drive shaft 7 by the second freewheeling element F2, in particular via the one-piece freewheeling-element carrier 9. In contrast to the drive devices 1, 11 and 21 in FIGS. 1, 2 and 3a, in the illustration in FIG. 4, the force-transmission device 7, 9 of the gear mechanism 4 is formed, however, both by the drive shaft 7 and by the one-piece freewheeling-element carrier 9. In the illustration of FIG. 4, the sun gear SR of the planetary gear set of the gear mechanism 4 is formed in one piece with this force-transmission device 7, 9. Therefore, in the drive device 31 in FIG. 4, the sun gear SR of the planetary gear set of the gear mechanism 4, the drive shaft 7 and the one-piece freewheeling-element carrier 9 are formed together in one piece. This makes it possible for the drive device 31 to be designed in a particularly straightforward manner, since fewer components have to be used than for the design of the drive devices 1, 11 and 21.

Furthermore, in the drive device 31 in FIG. 4, the drive wheel 8 is mounted in the housing 10 of the drive device 31. This makes it possible for the one-piece freewheeling-element carrier 9 to be arranged radially inwards in relation to the ball bearing KL1 of the drive wheel 8, as seen with respect to the longitudinal axis LA of the drive shaft 7. The freewheeling-element carrier 9 and the ball bearing KL1 can therefore be arranged in a radially stacked manner. It is thus possible to cut back on the amount of installation space required in the axial direction with respect to the longitudinal axis LA of the drive shaft 7.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS

1; 11; 21; 31 electric drive device
3 bottom bracket
4 gear mechanism, planetary gear mechanism
SR sun gear
PR planet gear
PT planet carrier
HR ring gear
5 electric motor
6 pedal-crank shaft
62 pedal crank
7; 7' drive shaft
8; 8' drive wheel
81 traction means, chain
F1 first freewheeling element, first pawl
F2 second freewheeling element, second pawl
9 freewheeling-element carrier
7; 7'; 9 force-transmission device
10 housing
10a sealing element
12 rotary element
L1, L2 bearing
KL1 ball bearing
LA longitudinal axis of the drive shaft

The invention claimed is:

1. An electric drive device (1; 11; 21; 31) for a bicycle, comprising:
    a gear mechanism (4) arranged in a bottom bracket (3) of the bicycle and comprising at least one planetary gear set, wherein the planetary gear set comprises at least three rotary elements (12; SR, PT, HR) arranged so as to be rotatable relative to one another and configured for torque transmission;
    an electric motor (5) offset relative to the gear mechanism (4);
    a drive shaft (7; 7') mounted at least on a pedal-crank shaft (6) of the bicycle;
    a drive wheel (8) arranged coaxially with the drive shaft (7; 7') and configured to transmit motor power from the electric motor (5) to the drive shaft (7; 7');
    a first freewheeling element (F1); and
    a second freewheeling element (F2),
    wherein the first freewheeling element (F1) and the second freewheeling element (F2) are arranged together in a one-piece freewheeling-element carrier (9),
    wherein the drive wheel (8) is connectable to the drive shaft (7; 7') by the first freewheeling element (F1) via the one-piece freewheeling-element carrier (9),
    wherein one of the rotary elements (12; SR, PT, HR) of the planetary gear set of the gear mechanism (4) is connectable to the drive shaft (7; 7') by the second freewheeling element (F2) via the one-piece freewheeling-element carrier (9), and
    wherein another of the rotary elements (12; SR, PT, HR) of the planetary gear set of the gear mechanism (4) is formed in one piece with a force-transmission device (7; 7'; 9) of the gear mechanism (4).

2. The electric drive device (1; 11; 21; 31) of claim 1, wherein the force-transmission device (7; 7'; 9) of the gear mechanism (4) is formed by the drive shaft (7; 7').

3. The electric drive device (1; 11; 21; 31) of claim 1, wherein the force-transmission device (7; 7'; 9) of the gear mechanism (4) is formed by the one-piece freewheeling-element carrier (9).

4. The electric drive device (1; 11; 21; 31) of claim 1, wherein the force-transmission device (7; 7'; 9) of the gear mechanism (4) is formed by the drive shaft (7; 7') and the one-piece freewheeling-element carrier (9).

5. The electric drive device (1; 11; 21; 31) of claim 1, wherein the drive shaft (7; 7') of the bicycle is mechanically operatively connected to at least one pedal crank (62), and a force-transmission path leads from the pedal crank (62) to the drive shaft (7; 7') via the gear mechanism (4).

6. The electric drive device (1; 11; 21; 31) of claim 5, wherein the motor power from the electric motor (5) is transmittable to the drive shaft (7; 7') in an end region of the force-transmission path.

7. The electric drive device (1; 11; 21) of claim 1, wherein the drive wheel (8) is mounted on the drive shaft (7; 7').

8. The electric drive device (31) of claim 1, wherein the drive wheel (8) is mounted in a housing (10) of the drive device (31).

9. The drive device (1; 21; 31) of claim 1, wherein the first freewheeling element (F1) and the second freewheeling element (F2) are arranged within the one-piece freewheeling-element carrier (9) so as to be, at least in certain regions, axially adjacent each other with respect to a longitudinal axis (LA) of the drive shaft (7; 7').

10. The drive device (11) of claim 1, wherein the first freewheeling element (F1) and the second freewheeling element (F2) are arranged within the one-piece freewheeling-element carrier (9) so as to be, at least in certain regions, radially adjacent to each other with respect to a longitudinal axis (LA) of the drive shaft (7; 7').

11. The drive device (1; 21; 31) of claim 1, wherein the first freewheeling element (F1) and the second freewheeling element (F2) are oriented in the same direction within the one-piece freewheeling-element carrier (9) with respect to a longitudinal axis (LA) of the drive shaft (7; 7').

12. The drive device (11) of claim 1, wherein the first freewheeling element (F1) and the second freewheeling element (F2) are oriented in opposite directions within the one-piece freewheeling-element carrier (9) with respect to a longitudinal axis (LA) of the drive shaft (7; 7').

13. The drive device (1; 11; 21; 31) of claim 1, wherein the first freewheeling element (F1) and the second freewheeling element (F2) are arranged within the one-piece freewheeling-element carrier (9) at a predefined distance from a longitudinal axis (LA) of the drive shaft (7; 7').

14. A bicycle, comprising:
    the electric drive device (1; 11; 21; 31) of claim 1; and
    two pedal cranks (62) arranged at opposite end portions of the pedal-crank shaft (6),
    wherein the pedal cranks (62) are mechanically operatively connected to the drive shaft (7; 7'), attached to the pedal-crank shaft (6), for manual driving the bicycle (2).

* * * * *